Patented Oct. 10, 1944

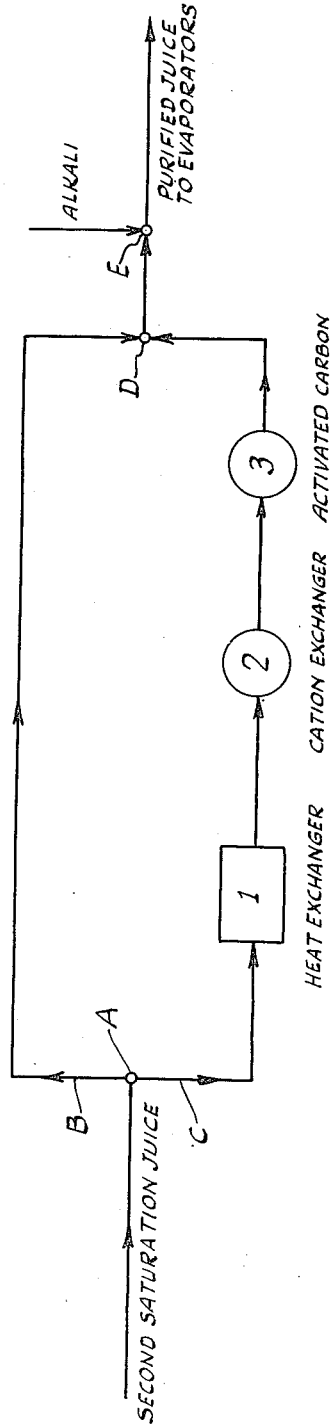

2,359,902

UNITED STATES PATENT OFFICE 2,359,902

PROCESS FOR THE PURIFICATION OF SUGAR JUICE

Henry W. Dahlberg, Denver, Colo., assignor to The Great Western Sugar Company, Denver, Colo., a corporation of New Jersey Application January 30, 1942, Serial No. 428,853

10 Claims. (Cl. 127—50)

This invention relates to new and useful improvements in processes for the purification of sugar juices.

The development of ion exchanger resins and other ion exchanger materials in recent years has led to various suggestions for their use in the purification of cane and beet sugar juices. For example, it has been proposed to treat second saturation juice of a beet sugar factory as follows: The juice would first be cooled and then brought into contact with cation exchanger material to remove sodium, potassium and other cations and replace them with hydrogen ions. The resulting juice, highly acid in reaction, would then be treated with activated carbon to remove coloring matter and certain nitrogenous organic compounds. Finally, the juice would be neutralized by bringing it into contact with anion exchanger material, which would adsorb acid ions previously associated with the cations removed by the cation exchanger and replace such ions with an equivalent quantity of hydroxyl ions. The result of all this would be a substantially neutral and practically colorless juice having a purity of about 98. In the manufacture of sugar from such juice a high quality sugar, free from sulfites, might be obtained. The sugar loss in molasses would amount to about 20 to 25% of that obtained when using the steps of liming and carbonation, followed by sulfitation, according to conventional beet juice purification processes.

The practical utilization of such a process, however, entails heavy installation and materials costs, and it still keeps the sugar factory under comparatively fixed operating conditions. The anion exchange treatment, in particular, is costly to install, and caustic soda, a costly reagent, is required for regeneration of the anion exchanger material after it has become saturated with acid ions. The necessary anion exchanger material costs about five times as much as the cation exchanger material, so that it would be quite expensive to treat the juice of a sugar factory by the proposed process.

One of the objects of this invention is to provide a process for the purification of sugar juices which produces juice of higher purity than conventional purification processes and yet is quite economical and practical to install and operate. Another object is to provide such a process which eliminates the sulfitation treatment of such conventional processes and so yields purified juice from which a high quality sugar, free from sulfites, may be produced.

A further object of this invention is to provide a process for the purification of sugar juice which makes it possible to vary and control the purity of the purified juice and hence the quantity of molasses to be produced in the manufacture of sugar therefrom, thereby enabling a more flexible control than heretofore over the operations of a sugar factory.

According to the present invention, I divide sugar juice that is to be purified or further purified into separate portions or streams and treat one of these portions, first with suitable cation exchanger material to remove objectionable cations and coloring matter, replacing such cations with an equivalent quantity of hydrogen ions, and next with activated carbon for further decolorization and to remove certain nitrogenous organic compounds remaining after the cation exchange treatment. The portion so treated is greatly purified but is made quite acid. I then take another portion of the juice, which must be distinctly alkaline and preferably is juice that has been made alkaline in a previous stage of juice purification, and I mix this other portion with the acidic treated portion so that the alkalinity of the former will be neutralized and will itself neutralize at least a large part of the excess acidity of the latter.

In one embodiment hereof, the volume of the alkaline juice portion is kept in such relation to the volume of the treated portion that the juice produced by mixing them will be approximately neutral and hence suitable for concentration and crystallization without further chemical treatment. The volume ratio necessary for this in any particular case depends upon the qualities of the juice entering the process and the qualities of the juice that has been subjected to the cation exchange and activated carbon treatments. In general, however, the volume of the treated portion will be substantially the smaller when following this embodiment.

According to another and the preferred embodiment hereof, the proportion of juice subjected to the cation exchange and activated carbon treatments is increased to such an extent that a substantial part, but not all, of its acidity will be neutralized by the later addition of the alkaline untreated portion. The mixture of the two portions therefore is excessively acid, but its excess acidity is then neutralized by adding a small amount of a suitable alkaline reagent, such as sodium hydroxide or other alkali, to bring the final juice to the pH condition desired for its further treatment. Increasing the proportion of treated juice in this manner, within practical limits, increases the volume of non-sugars removed from the juice in process and correspondingly raises its final purity.

By the use of this invention, therefore, the purity of the processed sugar juice may be varied by varying the diversion into portions of juice entering the process. This feature makes it possible and practical to control the volume of final molasses produced in the manufacture of sugar from the purified juice, for the non-sugars in the purified juice (the quantity of which is indicated by the juice purity) appear finally in the molasses, and the molasses consists of sugar in a fairly definite ratio to non-sugars, usually about 1.5 parts of sugar to 1 part of non-sugar in beet sugar practice.

The following describes a preferred manner of applying this invention to the purification of beet sugar juice, reference being made to the accompanying drawing, forming a part hereof, for a diagram of the preferred practice.

In conventional processes of beet juice purification, raw juice from the diffusion battery is heated and then subjected to liming and first and second carbonation treatments, followed by filtrations, which yield a juice that is still quite alkaline, known as second saturation juice. This juice is then further neutralized and decolorized by sulfitation, i. e. treatment with sulfur dioxide gas, to produce an approximately neutral juice suitable for concentration and crystallization. Second saturation juice, before sulfitation, has had about 30% to 40% of its non-sugar content removed in precipitates containing suspended solids and colloidal matter, non-sugars precipitated by the liming reagent as calcium compounds, and calcium carbonate formed from the excess of liming reagent. The remaining non-sugars consist mainly of alkali metal salts of organic and inorganic acids and various nitrogenous and non-nitrogenous organic compounds. Such non-sugars are not affected appreciably by the sulfitation step, so that sulfured juice has about the same purity coefficient as second saturation juice.

In the purification of beet sugar juice according to the present invention, instead of employing a treatment with sulfur dioxide, which injects sulfur compounds into the juice and forms objectionable sulfites in the sugar product, I preferably take second saturation juice directly from the second carbonation filter station, for example at a purity of 90 to 93 and a pH of 9.0 to 9.5, and at first divide this incoming juice into two separate portions or streams. As illustrated in the drawing, the division is made at A into two streams B and C, one to be treated with cation exchanger material and activated carbon, and the other to be re-united with the one stream, after its treatment, in producing a final juice suitable for concentration and crystallization. The volumes of streams B and C preferably are kept in a predetermined ratio, which, however, is subject to variation in the manner and with the results hereinafter described.

Since second saturation juice normally is too hot to resist inversion under conditions of pronounced acidity, the stream C is first cooled to a temperature suitable for that purpose, such as by passing it through one or more heat exchangers 1. The temperature of the juice leaving the heat exchanger preferably is about 15° to 25° C.

This cool juice is then brought into contact and reacted with a suitable cation exchanger material, preferably by passing it through a contact tower 2 containing a bed of granular cation exchanger material. Although any suitable cation exchanger material which operates reversibly in the so-called "hydrogen cycle" may be used for this purpose, those presently available are synthetic carbonaceous and resinous substances. Suitable examples are the products sold under the trade names "Nalcite A" (by the National Aluminate Corporation), "Catex" (by the International Filters Corporation), "Zeo-Karb" (by the Permutit Company) and "Amberlite I-R1" (by the Resinous Products and Chemical Company). These are understood to be sulfonated carbon compounds produced by the action of sulfuric acid on coal or other carbonaceous materials. A comprehensive description of such materials appears in a publication of Robert J. Myers et al., in Industrial and Engineering Chemistry, vol. 33, pp. 697–706 (1941). They sometimes are called "hydrogen exchange materials" to distinguish them from base exchange materials which do not operate in a hydrogen cycle.

The cation exchanger material in tower 2, for example, adsorbs about 98 to 99% of the sodium, potassium, alkaline earth and other inorganic cations in the juice stream, replacing them with hydrogen ions, as well as about 70% of the nitrogenous organic cations and more than 50% of the coloring matter. At the same time the juice is made quite acid, leaving tower 2 at about pH 1.5 to 2.0. This results from the release of the organic and inorganic acid radicals previously associated with cations adsorbed by the cation exchange material.

The acid juice produced by the cation exchange treatment is next brought into contact with activated carbon, for example, by passing it immediately from tower 2 through a tower 3 containing a bed of granular activated carbon. Various activated carbons may be used, such as those sold under the trade names "Darco" and "Super-Norit." The activated carbon absorbs substantially all of the remaining coloring matter from stream C and about 65% of the remaining nitrogenous compounds, while also neutralizing or absorbing an appreciable quantity of acids. The effluent from tower 3, for example, will have a purity of about 97 and an acidity equivalent to that of a 0.03 to 0.035 normal acid solution, which under these conditions corresponds to a pH of about 1.8 to 2.0.

This acid effluent, constituting the treated portion of the juice, is then mixed or re-united, as indicated at D, with the alkaline, untreated portion B of the incoming second saturation juice. It will be evident that the two streams thereupon neutralize each other to an extent determined by their respective volumes and their respective conditions of acidity and alkalinity. In practice, therefore, the portion of juice in stream C is kept at least large enough to overcome the excess alkalinity of the untreated second saturation juice in stream B, so that a purified juice may be produced by the subsequent mixing of the two streams without requiring resort to sulfitation.

Thus, according to one embodiment hereof, the streams B and C are proportioned so that they will approximately neutralize each other at point D, producing a final juice of about pH 6.8 to 7.5 that is suitable for direct passage into the evaporators. This condition is attained when about 40 to 80 parts of second saturation juice are apportioned to stream C for each 100 parts of such juice in stream B, the ratio in any particular case depending upon the quality of the incoming juice and the qualities of stream C after its treatments at 2 and 3. For the production of a quite neutral juice at D, the usual ratio is about 60 to 70 parts of second saturation juice in stream C for each 100 parts in stream B.

According to the preferred embodiment, however, the ratio of stream C to stream B is increased beyond that which will produce an approximately neutral mixture at D, and in this way a greater total juice purification and decolorization are obtained by the treatments at 2 and 3. In other words, enough untreated second saturation juice is apportioned to stream B to neutralize a large part, but not all, of the excess acidity of the treated juice when the two streams are later combined. The mixture produced at D therefore is objectionably acid, but this condition is overcome by adding a small amount of sodium hydroxide or other suitable alkali thereto, as indicated at E, to effect a further neutralization of acids and bring the final juice to the desired condition, preferably to about pH 6.5 to 7.2.

As an example of this preferred embodiment, second saturation juice is divided at A into two substantially equal streams, and the excess acidity of the mixture produced at D is overcome by adding about 0.15% to 0.20% of caustic soda to the juice at E, the percentage being by weight on juice dry matter. Under these conditions second saturation juice of about 93 purity is converted by the process into an approximately neutral juice of about 95 purity, about 30% of the non-sugars being removed. Since no sulfitation is used, a high quality sugar, free from sulfites, may be produced from the purified juice. Furthermore, the purity rise effected by the process improves the efficiency of sugar manufacturing operations and reduces the sugar losses in molasses.

The proportion of incoming juice allocated to stream C may be increased, if desired, until excessive alkali requirements make any further increase disadvantageous. In general, it is preferred not to increase the ratio of treated to untreated juice beyond that which will leave about 50% of the excess acidity of the treated juice to be neutralized by the addition of alkali. This limit is approached when the volume of the treated juice is about twice that of the untreated juice, when about 0.4% by weight of caustic soda is required to bring the ensuing mixture to approximate neutrality. The proportion of caustic soda to be added in the practice of this invention therefore may range from zero to about 0.4% by weight on juice dry matter.

Each ratio of the treated portion to the untreated portion of a juice processed pursuant hereto will result in a substantially definite purity for the final neutralized juice. The purity of juice passed to the evaporators, therefore, may be adjusted readily by changing the division of an incoming juice stream at point A. Since the final juice purity is definitely related to the quantity of final molasses produced in the manufacture of sugar from the same juice, the present process affords a novel and convenient means for varying and controlling the volume of molasses production in sugar factory operations.

It will be understood that various changes and alterations may be made in the practice of this invention without departing from its contributions to the art, which are intended to be defined by the appended claims.

I claim:

1. The process of purifying sugar juice which comprises treating a portion of the juice that is alkaline in reaction, at a temperature at which it resists inversion by acidity, with hydrogen exchange material and then with activated carbon to purify and decolorize the same, thereby rendering the same excessively acid, and thereafter mixing the portion so treated with another portion of juice that is alkaline in reaction, in a ratio sufficient to neutralize at least a substantial part of the excess acidity of the treated portion.

2. The process of purifying sugar juice which comprises treating a portion of the juice that is alkaline in reaction, at a temperature at which it resists inversion by acidity, with hydrogen exchange material and then with activated carbon to purify and decolorize the same, thereby rendering the same acid, and thereafter mixing the portion so treated with an amount of alkaline sugar juice sufficient to form an approximately neutral, purified mixture.

3. The process of purifying sugar juice which comprises treating a portion of the juice that is alkaline in reaction, at a temperature at which it resists inversion by acidity, with hydrogen exchange material and then with activated carbon to purify and decolorize the same, thereby rendering the same acid, thereafter mixing the portion so treated with an amount of alkaline sugar juice sufficient to neutralize only a large part of the excess acidity of the treated portion, and adding a suitable alkaline reagent approximately to neutralize the excess acidity of the resulting mixture.

4. The process of purifying sugar juice which comprises dividing alkaline juice to be purified into two separate portions, treating one of the portions at a temperature at which it resists inversion by acidity with hydrogen exchange material to purify the same, thereby rendering the same excessively acid, and thereafter reuniting the portion so treated with the other portion whereby to neutralize the excess alkalinity of the other portion and at least a large part of the excess acidity of the treated portion.

5. The process of purifying sugar juice and of controlling the quantity of molasses produced in the manufacture of sugar from the purified juice which comprises treating a predetermined portion of the juice at a temperature at which it resists inversion by acidity with hydrogen exchange material and then with activated carbon to decolorize the same and impart thereto a predetermined increased purity, thereby rendering the same acid, thereafter mixing the portion so treated with a predetermined portion of alkaline sugar juice, of predetermined purity, sufficient to neutralize at least a preponderant part of the acidity of the treated portion, and with enough alkali to neutralize any excess acidity of the treated portion, thereby forming approximately neutral, purified juice, and controlling the purity of the purified juice and the quantity of molasses to be produced therefrom by controlling the ratio of the volumes of the said portions.

6. The process of purifying alkaline sugar juice in the manufacture of sugar from sugar beets which comprises dividing the juice into two streams, cooling one of the streams to a temperature at which it resists inversion by acidity, treating the cooled stream with hydrogen exchange material and then with activated carbon to purify and decolorize the same, thereby rendering the same acid, thereafter reuniting the stream so treated with the other juice stream, and controlling the volumes of the two streams so as to neutralize at least a substantial part of the acidity of the treated stream by the alkalinity of the other stream.

7. A process for purifying sugar beet juice without sulfitation which comprises dividing suitably limed, carbonated and filtered second saturation juice, at a purity of 90 to 93 and a pH of about 9.0 to 9.5, into two separate streams of about equal volumes, cooling one of the streams to about 15° to 25° C., treating the cooled stream with hydrogen exchange material to purify the same, thereby rendering the same acid, and thereafter reuniting said streams and adding thereto an amount of alkaline reagent sufficient approximately to neutralize the mixture.

8. A process for purifying sugar beet juice without sulfitation which comprises dividing suitably limed, carbonated and filtered second saturation juice, having a purity of 90 to 93 and a pH of about 9.0 to 9.5, into two separate streams, one stream having between 40 and 100 parts of juice for each 100 parts of juice in the other stream, cooling said one stream to about 15° to 25° C., treating the cooled stream with hydrogen exchange material to purify the same, thereby rendering the same acid, and thereafter reuniting the stream so treated with the other stream to produce a purified juice having a pH of about 6.8 to 7.5.

9. A process which comprises dividing a continuous supply of alkaline sugar juice having a purity of about 90 to 93 into two separate streams, treating one of said streams, at a temperature at which it resists inversion by acidity, successively with hydrogen exchange material and activated carbon to purify and decolorize the same, thereby rendering the same acid, then reuniting the stream so treated with the other stream to produce a purified mixture, maintaining a ratio between the volumes of the two streams to render said mixture excessively acid, and adding enough alkaline reagent to overcome the excess acidity of the mixture.

10. A process for purifying sugar beet juice which comprises dividing second saturation juice, having a purity of 90 to 93 and a pH of 9.0 to 9.5, into two separate streams, cooling one of said streams to about 15° to 25° C., treating the cooled stream with hydrogen exchange material and then with activated carbon to purify and decolorize the same, thereby rendering the same acid, then mixing the stream so treated with the other stream, maintaining the volumes of said streams in a ratio to keep the resulting mixture excessively acid, and then adding not more than about 0.4% of caustic soda, on juice dry matter, to said mixture to adjust the pH thereof to about 6.5 to 7.2.

HENRY W. DAHLBERG.